(12) United States Patent
Petersen et al.

(10) Patent No.: US 7,100,494 B2
(45) Date of Patent: Sep. 5, 2006

(54) PISTON ARRANGEMENT

(75) Inventors: Christian Petersen, Hattstedt (DE); Heinz Otto Lassen, Flensburg (DE); Marten Nommensen, Flensburg (DE); Frank Holm Iversen, Padborg (DK)

(73) Assignee: Danfoss Compressors GmbH, Flensburg (DE)

( * ) Notice: Subject to any disclaimer, the term of this patent is extended or adjusted under 35 U.S.C. 154(b) by 35 days.

(21) Appl. No.: 11/001,222

(22) Filed: Dec. 1, 2004

(65) Prior Publication Data

US 2005/0120876 A1 Jun. 9, 2005

(30) Foreign Application Priority Data

Dec. 3, 2003 (DE) .................. 103 56 404

(51) Int. Cl.
*F16J 1/22* (2006.01)
(52) U.S. Cl. .......................... 92/187; 92/186
(58) Field of Classification Search ................ 92/186, 92/187, 188, 189, 190, 191
See application file for complete search history.

(56) References Cited

U.S. PATENT DOCUMENTS

| 1,294,538 A | | 2/1919 | Rose ..................... 92/160 |
| 1,350,747 A | * | 8/1920 | Stenger .................. 92/187 |
| 1,637,765 A | | 8/1927 | Comstock ................. 92/160 |
| 1,763,625 A | * | 6/1930 | Mellor .................... 92/186 |
| 1,787,638 A | | 1/1931 | Moore ..................... 92/160 |
| 2,289,251 A | | 7/1942 | Shearman ................. 92/160 |
| 2,317,004 A | | 4/1943 | Ferdinand et al. ........... 92/187 |
| 2,369,500 A | | 2/1945 | Wacber .................... 92/186 |
| 2,451,216 A | | 10/1948 | Halfvarson ................ 309/20 |
| 2,819,936 A | * | 1/1958 | Cambeis ................... 92/186 |
| 3,473,444 A | | 10/1969 | Leffers ................... 92/176 |
| 3,482,487 A | | 12/1969 | Leffers ................... 92/176 |
| 4,070,122 A | | 1/1978 | Wisner ................... 403/39 |
| 4,913,001 A | | 4/1990 | Watanabe et al. .......... 74/579 |
| 4,938,121 A | | 7/1990 | Melchior ................. 92/110 |
| 5,137,431 A | | 8/1992 | Kiyoshi et al. ........... 417/269 |
| 5,305,684 A | * | 4/1994 | Melchior ................. 92/187 |
| 5,669,285 A | | 9/1997 | Wiczynski et al. ......... 92/187 |
| 6,006,652 A | | 12/1999 | Peng ..................... 92/71 |
| 6,334,385 B1 | | 1/2002 | Wilksch .................. 92/188 |
| 6,470,791 B1 | * | 10/2002 | Welter et al. ............. 92/188 |
| 2002/0050425 A1 | | 5/2002 | Iversen et al. ........... 184/6.16 |

FOREIGN PATENT DOCUMENTS

| DE | 2 043 654 | 3/1972 |
| DE | 2510957 | 9/1976 |
| GB | 1 283 204 | 7/1972 |
| JP | 55-148985 | 11/1980 |
| JP | 56-12073 | 2/1981 |
| JP | 62297503 A2 | 12/1987 |
| JP | 63029075 A2 | 2/1988 |

* cited by examiner

*Primary Examiner*—Edward K. Look
*Assistant Examiner*—Michael Leslie
(74) *Attorney, Agent, or Firm*—McCormick, Paulding & Huber

(57) ABSTRACT

The invention concerns a piston arrangement having a piston with a piston head and a piston skirt and a connecting rod, which is connected with the piston via a ball joint arrangement comprising a ball, the ball being held in the piston by means of a safety element.

17 Claims, 1 Drawing Sheet

PISTON ARRANGEMENT

CROSS-REFERENCE TO RELATED APPLICATIONS

This application is entitled to the benefit of and incorporates by reference essential subject matter disclosed in German Patent Application No. 103 56 404.7 filed on Dec. 3, 2003.

FIELD OF THE INVENTION

The invention concerns a piston arrangement having a piston with a piston head and a piston skirt and a connecting rod, which is connected with the piston via a ball joint arrangement comprising a ball, the ball being held in the piston by means of a safety element.

BACKGROUND OF THE INVENTION

Such a piston arrangement is known from U.S. Pat. No. 2,451,216. Here, the piston head has an axially inwards extending projection with a spherical recess, in which the ball is supported. In an alternative embodiment, the spherical design is formed by a sheet metal element, which is inserted in the piston. Such a piston must be usable for a domestic refrigerator.

The connection between a piston and a connecting rod by means of a ball joint is also known from DE 25 10 957 A1. Here, the ball is held in the piston by a ball cup, which is made of a plastic material, which is sprayed or moulded onto the ball head.

JP 01-141274 A shows a further ball joint connection in a piston of a compressor, in which the ball is located in a recess in the piston head. The ball is held by a spring, which has passage openings for the entry of lubricating oil into the bearing surfaces.

JP 63-029075 A2 shows a similar embodiment, in which the piston head is made to be relatively thick. The piston head has a spherical recess, in which the ball is supported. The ball is held in the piston by a spring, which engages behind a circumferential projection.

When using such a piston arrangement in compressors, which are used for refrigeration units, it is endeavoured to keep the costs of manufacturing small.

It is an object of the present invention to improve upon or overcome the problems associated with the prior art.

SUMMARY OF THE INVENTION

The present invention resides in one aspect in a piston made of reshaped metal sheet and the ball is supported in a bearing area of a reinforcement element, which is located between the piston head and the ball.

With this embodiment, a reduction of the costs can be achieved primarily in that the piston itself can be made in a cheap manner. Merely a relatively thin metal sheet is required, with a thickness in the area between 0.6 and 1 mm, particularly in the area 0.7 to 0.8 mm. Such a metal sheet can easily be reshaped to some kind of cup, for example by means of deep-drawing. The bottom of the cup then forms the piston head and the circumferential wall forms the piston skirt. Thus, it is avoided to make the piston as a cast unit. Usually, a piston made of metal sheet is not able to adopt the high pressures, which occur in a refrigerant compressor. For this reason, the reinforcement element is used, which is located inside the piston. The reinforcement element has two tasks. Firstly, it reinforces the piston head, and secondly, with its bearing area it forms a support for adopting the ball of the ball joint arrangement. The ball, the reinforcement element and the piston are then simply kept together by the safety element, which simplifies the manufacturing substantially. Such a piston further has the advantage that it has a small mass. This has a favourable effect on the vibration behaviour of a compressor provided with such a piston, for example a refrigerant compressor. As the forces required for accelerating the piston are smaller, less energy and smaller balancing weights are required.

Preferably, the reinforcement element is displaceable in the radial direction in relation to the piston head. Thus, in the radial direction a distance between the reinenforcement element and the piston skirt is ensured. This distance may be relatively small. However, it permits the reinforcement element to centre itself during mounting. This means that the reinforcement element assumes a position, in which it has an optimum position in relation to the ball. Also when mounted, the reinforcement element will be able to move slightly, to be able to adopt a small out-of-roundness of the ball.

Preferably, the safety element only acts upon the ball. Thus, the safety element has an overall distance to the reinforcement element, which can of course be very small. The safety element does not hold the reinforcement element directly, but only via the ball in the piston. Thus, it is possible that the reinforcement element is displaced radially during mounting in such a manner that it forms an optimum seat for the ball. This means that the reinforcement element can centre itself and compensate for tolerances.

Preferably, the bearing area is spherically shaped and has a radius, which is larger than the radius of the ball. Thus, tolerances can be adopted even better.

Preferably, the reinforcement has a conical shape, at least in a radial outer area. This means that radially outwards the reinforcement element gets thinner and thinner. Thus, it is taken into consideration that the forces acting upon the piston head in the radially outer area can anyway be transferred to the piston skirt via relatively short paths. In the radial centre of the piston head, however, a larger reinforcement is required. The fact that the shape of the reinforcement element is adapted to the expected forces can save material. Firstly, the material saving ensures advantages with regard to costs. Further, however, they also involve advantages during operation, as the piston and its components can be made with a relatively small weight. As a piston made of a thin metal sheet has already a smaller mass than a piston made of cast iron, smaller balancing weights can be used. This keeps the tendency to oscillations and vibrations small. Thus, making the piston of metal sheet also gives a noise reduction.

Preferably, the reinforcement element is made of sintered metal, a cold-shaped metal or a temperature and pressure resistant plastic material, for example polyether etherketone (PEEK). In any case, the weight of the reinforcement element can be kept small. The costs for manufacturing the reinforcement element remain small. Also the ball can, for example, be made of sintered material to save costs.

Preferably, at least one oil channel is provided between the piston head and the reinforcement element. This oil channel enables a small oil flow on the inside of the piston head. By means of this oil flow, heat can be carried off, which occurs in a refrigerant compressor during a compression process of a gas. Thus, thermal tensions are kept small.

It is preferred that the oil channel is connected with a bore, which ends in the bearing area. The oil is firstly transported to the bearing area to lubricate the contact area between the ball and the reinforcement element, for example through the connecting rod, and can then assume the task of cooling.

Preferably, the safety element has the shape of a cup with a circumferential wall and a bottom provided with an opening for the passage of the connecting rod, a share of the bottom acting upon the ball. This embodiment of the safety element further increases the stability of the piston. Further, in the circumferential direction a relatively uniform holding force is achieved, which acts upon the ball. This improves the support of the ball between the safety element and the reinforcement element.

It is also advantageous that the bottom has a spherical bearing surface surrounding the opening, said surface being supported on the ball. Thus, two spherical surfaces are in contact with the ball, namely, firstly the bearing area in the reinforcement element and secondly the bearing surface in the safety element. The radius of the spherical bearing surface is adapted to the radius of the ball; however, an exact accordance is not required. To a certain extent, the safety element has flexible properties, so that the bearing surface can adapt to the surface of the ball.

Preferably, the bottom is inclined radially outwards in the direction of the piston head. Essentially, the bottom of the safety element then follows the contour of the reinforcement element. Two things result from this. Firstly, a gap occurs, through which the oil can penetrate between the reinforcement element and the safety element to the bearing area and to the bearing surface. This improves the lubrication of the bearing of the ball. Secondly, the at least partly conical shape of the bottom of the safety element provides a form, with which the bearing surface can be pressed against the ball with a certain prestressing, when the safety element is fixed in the piston.

Preferably, the safety element is made of sheet steel. Sheet steel has a sufficient stability to hold the ball at the reinforcement element and thus in the piston. Further, sheet steel has flexible properties, at least to an extent, which will be favourable for holding the ball in the piston.

Preferably, the safety element is fixed on the piston skirt in the area of the piston end facing away from the piston head. Thus, the fixing is made at an area of the piston, which is relatively far from the pressure chamber, which is bordered by the piston during operation. This keeps the risk small that the fixing will have a negative effect on the operating behaviour of the piston.

Preferably, the safety element is welded, glued or soldered onto the piston skirt. This means that joining parts are not needed when connecting the safety element and the piston skirt. In spite of this, connections are achieved, which are to a sufficient extent able to adopt the forces between the safety element and the piston.

Preferably, the piston skirt has a fixing area with reduced diameter, on which the safety element is fixed. Particularly, when the safety element is fixed on the piston skirt by means of a thermal process, like welding or soldering, the use of a reduced diameter has the advantage that the cylinder shape of the piston is not negatively affected by the fixing process.

Preferably, the piston skirt has, between the piston head and the fixing area, a further radially inwardly shaped axial section, on which the safety element bears from the inside. This axial section firstly has a certain supporting function, that is, seen in the axial direction the safety element is held in the piston at two positions. Secondly, the axial section also has the function of delimiting a channel between the safety element and the piston skirt, which channel is used for an oil flow. Finally, the piston skirt gets more rigid, which is favourable for a grinding process for working the circumference of the piston.

It is advantageous that between the fixing area and the axial section the safety element has an oil passage opening. In this case, the axial section can also be connected with the safety element to ensure an additional stability.

BRIEF DESCRIPTION OF THE DRAWINGS

In the following, the invention is described in detail on the basis of a preferred embodiment in connection with the drawings, showing.

DETAILED DESCRIPTION OF THE PREFERRED EMBODIMENTS

Figure 2:
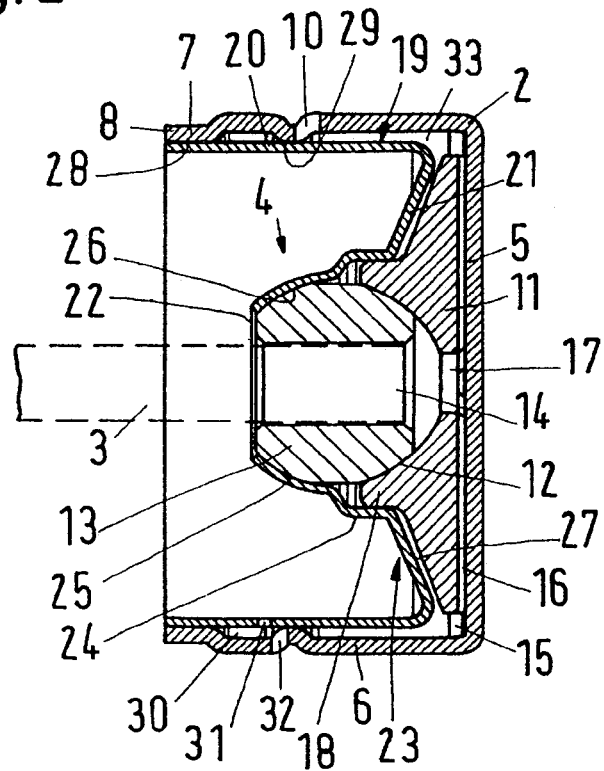
FIG. 2 is a section II—II according to FIG. 1.

A piston arrangement 1 has a piston 2 and a connecting rod 3, which are connected with each other by means of a ball joint arrangement 4, which is only shown in FIG. 2. In FIG. 2, the connecting rod 3, with which the piston 2 shall be driven, is merely shown with dotted lines.

Figure 1:
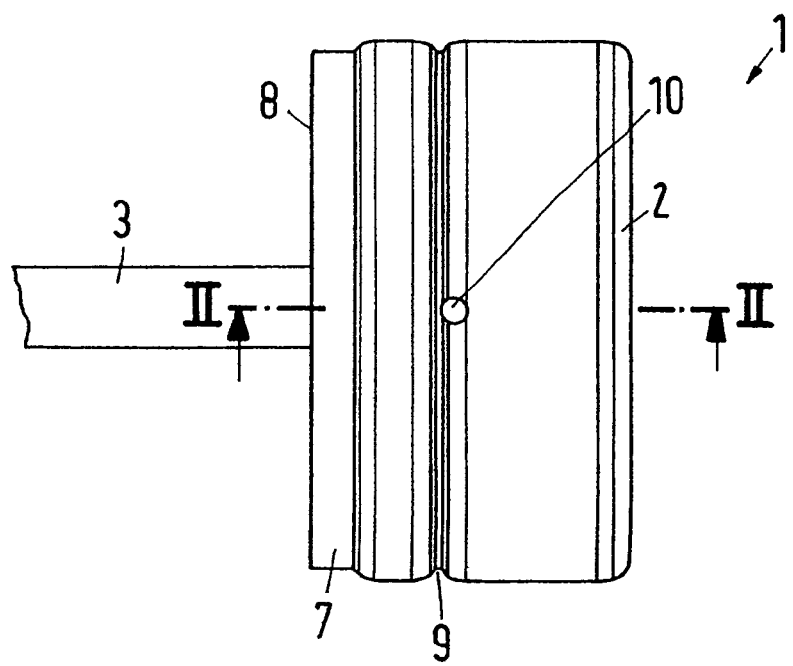
FIG. 1 is a side view of a piston.

The piston 2 has a piston head 5 and a piston skirt 6, the piston head 5 forming a front side of the piston 2 and the piston skirt 6 forming a circumferential wall of the piston 2. As can be seen from FIG. 1, the piston skirt has a first diameter reduction 7, which is located at an end 8 facing away from the piston head 5, and a second diameter reduction 9, which is located in the middle of the piston skirt and forms a circumferential groove. In this second diameter reduction 9 is provided an oil outlet bore 10, which will be explained in detail in the following.

The piston 2 is deep-drawn from a relatively thin metal sheet with a thickness in the area from 0.7 to 0.8 mm. Thus, it is relatively cheap in manufacturing.

On the inside of the piston head 5 is located a reinforcement element 11, which is made of sintered metal or a cold-shaped metal. The reinforcement element 11 forms a spherical bearing area 12 for a ball 13. In this connection, the radius of the bearing area 12 is slightly larger than the radius of the ball 13. The ball 13 has an opening 14, in which the connecting rod 3 is fixed.

The reinforcement element 11 is located with an all-over distance 15 to the inner wall of the piston skirt 6. This distance is at least as large as the recess, which has been caused by the diameter reduction, in order that the reinforcement element 11 can be inserted in the piston without collision with the piston skirt 6. Thus, the reinforcement 11 is radially displaceable within certain limits, as long as the mounting of the piston has not been finished.

Between the reinforcement element 11 and the inner wall of the piston head 5 is located at least one oil channel 16, which is formed by a groove, which is made on the bearing surface of the reinforcement element 11 on the piston head 5. Expediently, several oil channels 16 will be provided, for example by means of two diameter grooves, which are located at right angles to each other, and cross each other in the centre of the reinforcement element 11. Via a centric opening 17 in the reinforcement element 11, the oil channel 16 is connected with the bearing area 12, so that oil, which is supplied from the outside to the piston 2 through the connecting rod 3, can reach the oil channel 16.

The reinforcement element 11 has a conical-like shape, that is, it tapers from radially inside to radially outside in the direction of the piston head. In the middle of the reinforcement element 11 is provided a substantially cylinder-shaped projection 18, which somewhat increases the bearing area 12 in the axial direction of the piston 2, that is, parallel to the piston skirt 6. With this embodiment, it is considered that, in the area of the radial outer edge, the forces acting upon the piston head 5 can be transferred to the piston skirt 6 via relatively short paths anyway, while the piston head 5 in the middle will require a larger reinforcement. At the same time, the shape shown keeps the mass of the reinforcement element 11 small, so that the total mass of the piston 2 and its components will also be relatively small.

The ball 13, which can also be made of a sintered metal, is held in the bearing area 12 by a safety element 19. The safety element 19 is made to be cup-shaped with a circumferential wall 20 and a bottom 21. The circumferential wall 20 is closed in the circumferential direction. The bottom 21 has an opening 22, through which the connecting rod 3 is guided.

The bottom 21 follows the contour of the reinforcement element 11, that is, where the reinforcement element 11 has a conical shape, it has a correspondingly inclined section 23, which extends into a cylinder section 24, which surrounds the projection 18 with a small distance. The cylinder section 24 is connected with a bearing section 25, on whose inside is formed a spherical bearing surface 26, which bears on the ball 13. The radius of the bearing surface 26 is adapted to the radius of the ball 13, also when here an exact accordance is not required. The safety element 19 is made of sheet steel, for example by deep-drawing. It therefore has certain flexibility properties, so that within certain limits the bearing surface 26 can adapt to the ball 13. However, it can also be made of a plastic material, which can adopt corresponding loads. In this case additional weight can be saved.

The safety element 19 only acts upon the ball 13, that is, it has no contact with the reinforcement element 11. This involves the advantage that the reinforcement element 11, which is, as stated above, arranged to be movable in the radial direction, can adjust itself to the ball 13 during mounting. Not until the safety element 19 has been fixed in the piston 2, also the reinforcement element is substantially secured in the piston.

The inclined section 23 of the reinforcement element 19 follows the inclined upper side of the reinforcement element 11. Thus, a gap 27 is formed, through which oil can penetrate into the bearing area 12 also from the side of the projection 18.

On the inside of the first diameter reduction 7 is formed a fixing area 28, on which the safety element 19 is connected with the piston skirt 6, for example by welding, gluing or soldering. As the fixing area 28 is located on the section of the piston skirt 6 with reduced diameter, the risk is small that the fixing of the safety element 19 on the piston skirt 6 will cause deviations of the piston skirt 6 from the cylinder shape.

Between the fixing area 28 and the reinforcement element 11 an axial section 29 is provided on the inside of the second diameter reduction 9, on which axial section 29 the safety element 19 is connected with the piston skirt 6 one more time. However, a connection here can also be avoided. However, the circumferential wall 20 of the safety element 19 is here supported outwards on the piston skirt 6.

Between the piston skirt 6 and the circumferential wall 20 of the safety element 19 is formed a circumferential channel 30, which is bordered in the axial direction by the fixing area 28 and the axial section 29. Oil, which is supplied to the piston, penetrates through the piston 2 via the oil outlet opening 10 to the groove, which can also be called lubrication groove. Here, the oil flows through an area 33 between the piston skirt 6 or the piston head 5, respectively, and the safety element 19. From here, the oil can get into the gap 27 to lubricate the bearing of the ball 13 in the reinforcement element 11 or in the safety element 19, respectively. An inlet opening 32 connects the groove, which is formed by the second diameter reduction 9, with the channel 30. In its circumferential wall 20, the safety element 19 has an oil outlet opening 31, through which oil, which reaches the channel 30, is sprayed from the channel 30 into the inside of the piston 2.

In a manner not shown in detail, the safety element 19 can also be fixed in the piston in other manners, for example by means of a catch connection.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A piston arrangement having a piston, comprising:
a piston head and a piston skirt and a connecting rod, which is connected with the piston via a ball joint arrangement comprising a ball, the ball being held in the piston by means of a safety element, wherein the piston is made of a reshaped metal sheet and the ban is supported in a bearing area of a reinforcement element, which is located between the piston head and the ball, the reinforcement element having a bearing surface, which bears on the piston head.

2. The piston arrangement according to claim 1, wherein the reinforcement element is displaceable in the radial direction in relation to the piston head.

3. The piston arrangement according to claim 2, wherein the safety element does not act directly upon the reinforcement element.

4. The piston arrangement according to claim 1, wherein the bearing area is spherically shaped and has a radius, which is larger than the radius of the ball.

5. The piston arrangement according to claim 1, wherein the reinforcement element has a conical shape, at least in a radially outer area.

6. The piston arrangement according to claim 1, wherein the reinforcement element is made of sintered metal, a cold-shaped metal or a temperature and pressure resistant plastic material.

7. The piston arrangement according to claim 1, wherein at least one oil channel is provided between the piston head and the reinforcement element.

8. The piston arrangement according to claim 7, wherein the oil channel is connected with a bore, which ends in the bearing area.

9. The piston arrangement according to claim 1, wherein the safety element has the shape of a cup with a circumferential wall and a bottom provided with an opening for the passage of the connecting rod, a share of the bottom acting upon the ball.

10. The piston arrangement according to claim 9, wherein the bottom has a spherical bearing surface surrounding the opening, said surface being supported on the ball.

11. The piston arrangement according to claim 9, wherein the bottom is inclined radially outwards in the direction of the piston head.

12. The piston arrangement according to claim 1, wherein the safety element is made of sheet steel.

13. The piston arrangement according to claim 1, wherein the safety element is fixed on the piston skirt in the area of the piston end facing away from the piston head.

14. The piston arrangement according to claim 13, wherein the safety element is welded, glued or soldered onto the piston skirt.

15. The piston arrangement according to claim 1, wherein the piston skirt has a fixing area with reduced diameter, on which the safety element is fixed.

16. A piston arrangement having a piston, comprising:
a piston head and a piston skirt and a connecting rod, which is connected with the piston via a ball joint arrangement comprising a ball, the ball being held in the piston by means of a safety element, wherein the piston is made of a reshaped metal sheet and the ball is supported in a bearing area of a reinforcement element, which is located between the piston head and the ball;
wherein the piston skirt has a fixing area with reduced diameter, on which the safety element is fixed; and
wherein the piston skirt has, between the piston head and the fixing area, a further radially inwardly shaped axial section, on which the safety element bears from the inside.

17. The piston arrangement according to claim 16, wherein between the fixing area and the axial section the safety element has an oil passage opening.

\* \* \* \* \*

UNITED STATES PATENT AND TRADEMARK OFFICE
CERTIFICATE OF CORRECTION

| | |
|---|---|
| PATENT NO. | : 7,100,494 B2 |
| APPLICATION NO. | : 11/001222 |
| DATED | : September 5, 2006 |
| INVENTOR(S) | : Christian Petersen et al. |

It is certified that error appears in the above-identified patent and that said Letters Patent is hereby corrected as shown below:

Column 6, Claim 1, line 6, please delete the word "ban" and replace it with --ball--.

Signed and Sealed this

Twenty-third Day of January, 2007

JON W. DUDAS
*Director of the United States Patent and Trademark Office*